Aug. 17, 1926.

A. H. KEMPER 1,596,274

TEAKETTLE OR THE LIKE

Filed Dec. 26, 1925

INVENTOR
BY Albert N. Kemper
ATTORNEY

Patented Aug. 17, 1926.

1,596,274

UNITED STATES PATENT OFFICE.

ALBERT H. KEMPER, OF DAYTON, OHIO.

TEAKETTLE OR THE LIKE.

Application filed December 26, 1925. Serial No. 77,827.

This invention relates to improvements in teakettles, or the like, having reference generally to closed vessels for heating water or other liquids.

The objects attained in the invention are a closed heating vessel of this character in which a portion of the liquid will be heated quicker than the remaining portion, which will be more readily accessible as to its interior parts for cleaning and the removal of the sediment which forms in heating vessels of this character, and which can be manufactured and sold as a low priced article.

Figure 1:
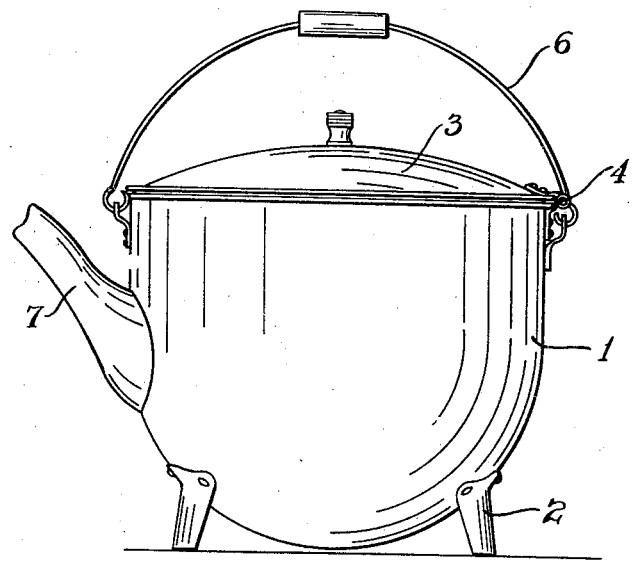
Figure 2:
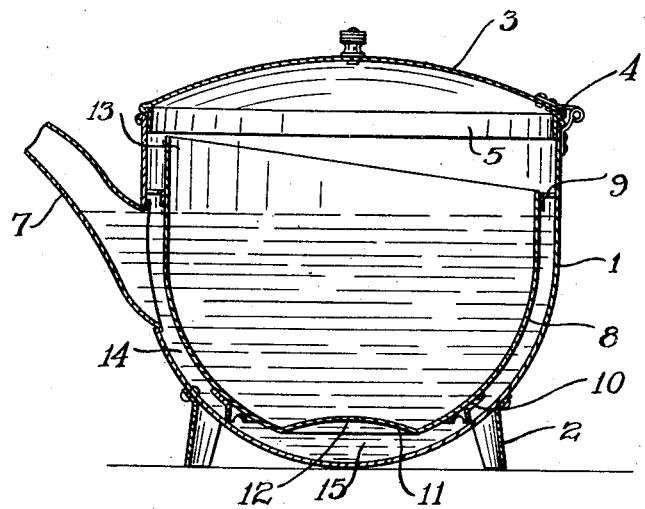

In the accompanying drawings the invention is shown as applied to a teakettle in views which illustrate its novel features. In the drawings, Fig. 1 is a side elevation of the kettle and Fig. 2 is a vertical sectional view of the same.

As here shown the improved kettle consists of an outer container 1 supported on feet 2 and provided with a lid 3. The lid is hinged to part 1 as indicated at 4 and has a downwardly extended flexible flange 5 which fits the open top of part 1 snugly by compression of the flange 5. Part 1 is further provided with a bail 6 and a spout 7.

The novel features of the kettle consist in an inner container 8 provided with annular flanges 9—10 and adapted to set freely within the container 1, the flanges serving to support the inner container and to space it from the adjacent wall of the outer container. Part 8 is recessed inwardly at the bottom as indicated at 11 and is provided with an aperture 12 in the recessed portion to permit the liquid to pass from the inner to the outer container. Part 8 is inclined downwardly at the top oppositely from spout 7, the higher front portion 13 of the wall adjacent the spout acting to prevent discharge from the inner container over its top edge when the kettle is tilted forward at an angle to discharge the liquid from the spout.

Liquid supplied to the kettle is delivered into the container 8; the annular space 14 between the containers then fills by gravity movement of the liquid through port 12 until the liquid stands at a level in both containers, it being observed that there will be a heavier or deeper portion of the liquid in space 15 downwardly adjacent the recessed bottom 11 where the heat is applied to the kettle.

The liquid in the shallow space 14 of container 1 will heat quicker than the liquid in container 1 or than would result in a single container of like capacity, the greater depth of liquid in space 15 acting to protect the metal exposed to the heat in case of the liquid in the kettle falling below normal limits for heating.

To afford convenient accessibility to the kettle for cleaning, etc., the top of container 1 is made full open, or provided with an opening large enough to permit of the free removal and replacement of the inner container in which the scale or sediment formation under normal conditions of use will be soft and can easily be washed or scraped out. With the inner member removed the interior of the outer member is also accessible and can be in like manner conveniently cleaned.

It will be observed that the general design of the kettle lends itself to cheap processes of manufacturing, the parts 1, 3 and 8 being adapted for sheet metal spinnings and all other parts for die formations.

Having described my invention, I claim:

1. A kettle comprising an outer container, an inner container removably supported in the outer container and adapted to be supplied with a liquid, the containers being spaced one from the other to form a narrow space therebetween, a port in the lower portion of the inner container for the liquid to move gradually by gravity to said space, and means for discharging the liquid from said space only.

2. A kettle comprising an outer container, an inner container removably supported in the outer container and adapted to be supplied with a liquid, the containers being spaced one from the other to form a narrow space therebetween, a port in the lower portion of the inner container for the liquid to move restrictedly by gravity from the inner container and means to prevent overflow of liquid from the inner container as the kettle is turned at an angle to discharge liquid from the outer container.

3. A kettle comprising an outer container, an inner container removably supported in the outer container and adapted to be supplied with a liquid, the containers being spaced one from the other to form a narrow space therebetween, a port permitting liquid from the inner container to move by gravity to said space, a spout communicating with said space and an upwardly extended wall of the inner container adjacent the spout acting to prevent overflow of liquid from the inner container as the kettle is turned at an angle to discharge liquid from the outer container through said spout.

4. A kettle comprising an outer container, an inner container removably supported in the outer container and adapted to be supplied with a liquid, the containers being spaced one from the other to form a narrow space therebetween, the inner container being recessed at the bottom to enlarge the portion of said space adjacent thereto, a port permitting liquid from the inner container to move restrictedly by gravity only to said enlarged space, and means for discharging the liquid from the outer container only.

5. A kettle comprising an outer container closed by a lid, an inner container supported in the outer container and removable through the opening for said lid, the outer container having a spout and the inner container an inclined up-turned, open end with its highest point adjacent said spout and above the outlet opening from said outer container to said spout to prevent overflow of the liquid from the inner container as the kettle is tilted at an angle to discharge liquid from the outer container.

In testimony whereof, I affix my signature.

ALBERT H. KEMPER.